United States Patent
Ahonen et al.

(10) Patent No.: US 7,627,755 B2
(45) Date of Patent: Dec. 1, 2009

(54) SECURE BROADCAST/MULTICAST SERVICE

(75) Inventors: Pasi Ahonen, Oulu (FI); Uusitalo Iikka, Oulu (FI); Mantyla Vesa-Matti, Oulu (FI)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 416 days.

(21) Appl. No.: 10/527,368

(22) PCT Filed: Sep. 13, 2002

(86) PCT No.: PCT/EP02/10400

§ 371 (c)(1),
(2), (4) Date: Jan. 4, 2006

(87) PCT Pub. No.: WO2004/025895

PCT Pub. Date: Mar. 25, 2004

(65) Prior Publication Data

US 2006/0168446 A1  Jul. 27, 2006

(51) Int. Cl.
*H04L 29/06* (2006.01)
*H04L 9/00* (2006.01)

(52) U.S. Cl. .................. 713/163; 713/156; 713/162; 713/176; 713/178; 726/10

(58) Field of Classification Search ............. 713/163, 713/162
See application file for complete search history.

(56) References Cited

U.S. PATENT DOCUMENTS

| | | | | |
|---|---|---|---|---|
| 5,790,677 A * | 8/1998 | Fox et al. | | 705/78 |
| 6,049,878 A | 4/2000 | Waldvogel et al. | | |
| 6,275,859 B1 | 8/2001 | Kadansky et al. | | |
| 6,397,329 B1 | 5/2002 | Aiello et al. | | |
| 7,149,308 B1 * | 12/2006 | Fruehauf et al. | | 380/44 |
| 7,286,671 B2 * | 10/2007 | Yegin et al. | | 380/270 |
| 7,334,125 B1 * | 2/2008 | Pellacuru | | 713/163 |
| 7,360,084 B1 * | 4/2008 | Hardjono | | 713/163 |
| 2002/0174366 A1 * | 11/2002 | Peterka et al. | | 713/201 |
| 2003/0053434 A1 * | 3/2003 | Chow et al. | | 370/338 |
| 2005/0044356 A1 * | 2/2005 | Srivastava et al. | | 713/163 |
| 2005/0097316 A1 * | 5/2005 | Kim | | 713/163 |
| 2005/0259682 A1 * | 11/2005 | Yosef et al. | | 370/468 |
| 2007/0204149 A1 * | 8/2007 | Balfanz et al. | | 713/156 |

FOREIGN PATENT DOCUMENTS

| GB | 2 367 986 A | 4/2002 |
|---|---|---|
| GB | 2367986 | 4/2002 |

* cited by examiner

*Primary Examiner*—William R Korzuch
*Assistant Examiner*—Sarah Su

(57) ABSTRACT

A method of authenticating candidate members 1 wishing to participate in an IP multicast via a communication network, where data sent as part of the multicast is to be encrypted using a Logical Key Hierarchy based scheme requiring that each candidate member submit a public key to a group controller. The method comprises, at the group controller 1, verifying that the public key received from each candidate member 1 is owned by that member and that it is associated with the IP address of that candidate member 1 by inspecting an interface ID part of the IP address.

24 Claims, 4 Drawing Sheets

SECURE BROADCAST/MULTICAST SERVICE

FIELD OF THE INVENTION

The present invention relates to a method and apparatus for enabling a secure broadcast/multicast service, using which service data can be sent to a plurality of receiving entities.

BACKGROUND TO THE INVENTION

Today, there are many applications in which data is broadcast or multicast to a group of individual receivers via some communication channel. Terrestrial and satellite television and radio transmissions are obvious examples. In the Internet, streaming video and audio signals can be broadcast or multicast to individual Internet terminals using the Internet Protocol (IP). In the very near future, technologies such as those defined by 3GPP will allow the broadcasting/multicasting of streaming IP data to mobile handsets. Subscribers will be able to listen to music and watch concerts and football games via their mobile handsets.

With respect to IP, the term "multicast" can be defined as follows:

"An IP technology that allows for streams of data to be sent efficiently from one to many destinations. Instead of setting up separate unicast sessions for each destination, multicast will replicate packets at router hops where the path to different multicast group members diverges. This allows a source to send a single copy of a stream of data, while reaching any number of possible receivers."

For a number of reasons, it is often necessary to be able to send multicast signals (it will be appreciated that reference here to "multicast" is only by way of example and that the following discussion applies equally to broadcast signals) in such a way that only authorised receivers can make use of the signals. The nature of the material may make this necessary, for example to prevent children from viewing adult content. In the case of a subscription service, it may be necessary to prevent receivers who have not paid for a service from using a received signal.

In a typical IP multicast scenario, the source entity of the multicast stream acts as a Group Controller (GC). The GC is responsible for establishing and maintaining a secure connection with each user or "receiver" which has registered with the GC to receive the multicast data. According to the latest proposals the Secure Real-time Transport Protocol (SRTP) is likely to be used to provide secure connections in 3G networks. SRTP requires that a Traffic Encryption Key (TEK) be shared between the multicast source and the receivers.

It is the essence of a multicast that only one stream of data is transmitted from the GC and so it is essential that, if the data is to be encrypted, it is encrypted with only a single TEK known to all of the receivers. A simple mechanism to achieve the dissemination of the TEK from the GC to the receivers is for the GC to receive from each receiver, during a registration process, a public key part of a public-private key pair belonging to the receiver. The GC then encrypts the TEK with a receiver's public key and transmits it to the receiver. This is repeated for each receiver. Each receiver can then decrypt the TEK using the private key of their public-private key pair.

Any system must be able to deal with new receivers joining the group and old receivers leaving, in a practical manner. This requires that when new receivers join the group, they are given a new TEK and all existing receivers are notified of the new TEK and informed that this key replaces the previous TEK. When a receiver leaves the group, a new TEK must be generated by the GC and transmitted to all remaining receivers—the departing receiver must not receive, or at least not be able to make use of, the new TEK. With the procedure described in the previous paragraph, each time a new TEK is generated, the GC must generate and send a separate message to each receiver. Especially for services having a large number of subscribers, this places an extremely large processing load on the GC and a large signalling load on the network.

In order to reduce the processing and signalling, a key management principle known as Logical Key Hierarchy (LHK) has been proposed. This is described in detail in IETF Informational RFC2627 "Key Management for Multicast: Issues and Architectures", Section 5.4. According to this principle, a logical tree structure is created as illustrated for example in FIG. 1. Each node of the tree represents a symmetric encryption key. The key at the top of the tree is the TEK. Other keys in the tree are referred to as LKH keys. Typically, there is a one-to-one mapping between subscribers and the nodes at the bottom layer of the tree. In the tree of FIG. 1, the keys are defined as $LKH_{x,y}$ where x represents the tree layer and y is the layer index. The key $LKH_{11}$ corresponds to the TEK whilst the keys $LKH_{41}$ to $LKH_{44}$ are allocated to subscribers M1 to M4 respectively and are referred to hereinafter as Key Encryption Keys (KEKs).

Upon registration of a subscriber with the GC (consider for example subscriber M1 in FIG. 1), the subscriber provides to the GC the public key of a public-private key pair "owned" by the subscriber. The GC then encrypts a unique Key Encryption Key (KEK) with the subscriber's public key. The GC must then generate a new TEK to replace the old TEK. It must also generate new LKH keys (layers 2 and 3) for each of the nodes in the chain between the TEK node and the subscriber node. It then encrypts this new TEK and the other new LKH keys in the chain, with the subscriber's KEK. The encrypted KEK, TEK and LKH keys are combined into a single message (illustrated in FIG. 2) which is unicast to the new subscriber. Once this has been decrypted by the new subscriber, the subscriber can decrypt the LKH keys and the TEK.

The GC must then inform other subscribers of the new TEK. For the other subscriber attached to the same level 3 node as the new subscriber (i.e. subscriber M2), the GC must generate and unicast a separate message for that subscriber, encrypting the new TEK and intermediate keys with the subscriber's own KEK (that subscriber's KEK has not changed). For subscribers M3 and M4 which are connected to the same level 2 node, the GC can multicast a single message containing the new TEK and the new key $LKH_{21}$, encrypted using the key $LKH_{32}$, which remains unchanged. For the subscribers M5 to M8, the new TEK is sent in a single multicast message encrypted with the unchanged key $LKH_{22}$. A similar procedure is followed when a subscriber leaves the group. It will be appreciated the LKH algorithm significantly reduces the number of messages which the GC must multicast in any one rekeying operation.

SUMMARY OF THE INVENTION

In any service making use of LKH, an important consideration will be the authentication of users so that the TEK is distributed only to authenticated users. Authentication can be done manually. For example, a subscriber to a service could call the service provider, pay a fee using a credit card, and receive a passcode. The subscriber enters the passcode into his terminal, and this is sent to the GC (e.g. encrypted with a public key owned by the GC. Another possibility is the use of Public Key Infrastructure (PKI) procedure, where a subscriber receives a certificate verifying that he is authorised to use the service, and verifying that the public key contained in the certificate belongs to that subscriber. The certificate is sent to the GC as part of the registration procedure. However, both of these procedures require considerable effort, and are not necessarily suitable for informal communications which are either short term or informal.

According to a first aspect of the present invention there is provided a method of authenticating candidate members wishing to participate in an IP multicast via a communication network, where data sent as part of the multicast is to be secured using a key revocation based scheme requiring that each candidate member submit a public key to a group controller, the method comprising:

at the group controller, verifying that the public key received from each candidate member is owned by that member and that it is associated with the IP address of that candidate member by inspecting an interfaceID part of the IP address.

Embodiments of the present invention provide a lightweight authentication and key distribution mechanism which is applicable in particular to multimedia multicast applications. If necessary, authorisation (e.g. confirmation of payment) can be handled by any appropriate mechanism.

Preferably, said key revocation based scheme is a Logical Key Hierarchy based scheme. However, it will be appreciated that other key revocation based schemes requiring the use of a public key can be used.

Preferably, each candidate member generates an interfaceID part of its own IPv6 address by taking a cryptographic hash over its own public key and one or more other parameters. A candidate member sends a joining request to the group controller which contains: the member's IP address including the generated interface ID; its own public key; and a signature over the entire message generated using the member's private key. Upon receipt of the message, the group controller: a) uses the received public key to confirm that the signature is valid, thus proving that the candidate member does indeed own the public-private key pair to which the received public key belongs and b) applies the same cryptographic hash (as used by the candidate member) to the public key and the other parameter(s) and compares the result to the interfaceID part of the member's IP address, thus verifying that the source IP address is owned by the candidate member.

According to the LKH based scheme, after the group controller has received the public key from a given member and has verified that the public key is associated with the IP address of the sender, the group controller sends a unique Key Encryption Key to the member, encrypted with that member's public key. The group controller also sends a Traffic Encryption Key and a LKH key set to the member, encrypted with the Key Encryption Key.

The invention may be employed in a one-way multicast where a single node, e.g. the group controller, multicasts a stream of data to several other nodes.

Alternatively, the invention can be employed where each of the members of a group multicast data to all other members of the group. A particular application of the present invention is to provide a mechanism for authenticating candidates seeking to participate in a tele- or videoconference or a multimedia conference. In this scenario, the group controller may be a member of the group, and may be predesignated or designated dynamically, e.g. by negotiation between the group members.

According to a second aspect of the present invention there is provided a method of authorising a user to participate in a secure IP multicast or broadcast and in which security keys are distributed to group members using a key revocation based mechanism, the method comprising:

delivering a certificate to the user, the certificate verifying that a public-private key pair identified in the certificate can be validly used by the user to access said secure multicast/broadcast;

subsequently verifying at a control node that the certificate is owned by the user using a proof-of-possession procedure; and assuming that verification is obtained, using said public key to send a Key Encryption Key to the user.

Preferably, said key revocation based scheme is a Logical Key Hierarchy based scheme.

Preferably, said step of verifying at a control node that the certificate is owned by the user, is carried out after the control node receives a request from the user to join said secure multicast or broadcast. The certificate may for example provide the user with a one-time access to the service (or to a group of services), or may provide time-limited access to the service.

In certain embodiments of the present invention, said proof-of-possession procedure involves the control node sending a random number (nonce) to the user in plain text. The user sends a response to the control node containing a signature generated by applying the private key (of the user's public-private key pair) to the random number. The control node is in possession of the user's certificate and can check whether or not the message is correctly signed with the user's private key. If so, then the control node sends the allocated Key Encryption Key to the user encrypted with that user's public key.

In certain embodiments of the present invention, the user to be authorised has a subscription to a first, home communication network and wishes to participate in a multicast or broadcast service via a second, foreign network in which the user is roaming. The visited network contacts the user's home network upon receipt of an initial registration request. The AKA procedure may be used for this purpose. The next step in the procedure is the generation of the requested (and paid for) certificate. This requires the generation of a public-private key pair, either at the user equipment or with one of the networks (home or visited). The certificate may be signed either by the home or visited network, or even by a third party. The certificate can subsequently be used to access the service, with the visited network sending a required KEK to the user equipment.

The present invention is applicable in particular to multicasts/broadcasts to and between mobile wireless terminals, e.g. handsets, which communicate with a wireless network, e.g. a 3GPP defined mobile telecommunications network. Example of multicast/broadcast services include the distribution of streaming data to subscribers, e.g. audio, multimedia, etc, and teleconferencing (again, audio, multimedia, etc).

DETAILED DESCRIPTION OF A PREFERRED EMBODIMENT

Reference has been made above to the LKH algorithm and its use in multicast and broadcast services to disseminate a Traffic Encryption Key (TEK) to authorised "subscribers", e.g. users who have paid an appropriate subscription to the service provider. An example of a multicast service is a teleconference in which a number of users (typically three or more) can participate in a collective voice call using some appropriate IP bearer network. This network may be the Internet or may be a telephone network, for example a 3G mobile network.

Figure 3:
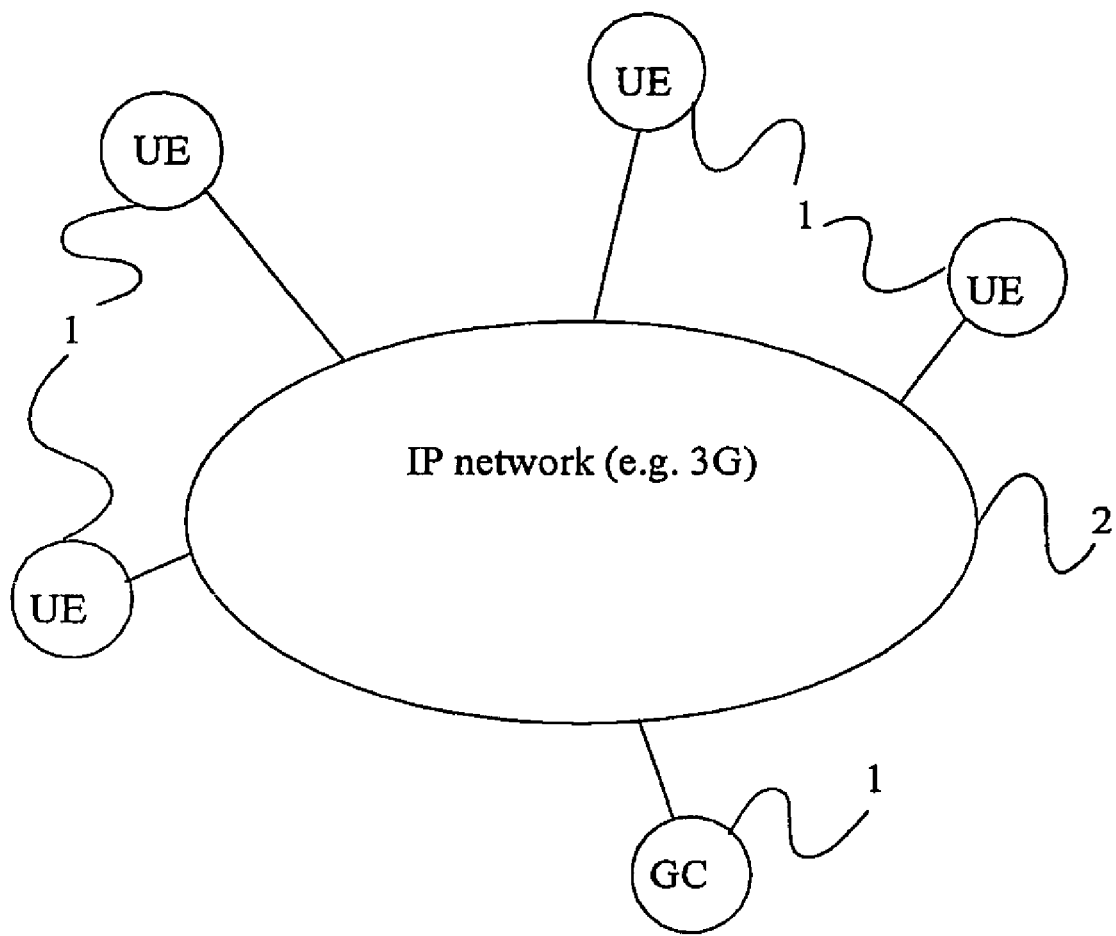
FIG. 3 illustrates an ad hoc grouping of mobile terminals participating in a teleconference over an IP-based network.

Considering the example of a teleconference, FIG. 3 illustrates a number of user terminals 1, coupled to an IP network 2. Each terminal has installed therein some application which allows users to participate in a teleconference. One of the terminals is designated as a Group Controller (GC): the GC may be predesignated or may be appointed as a result of a negotiation between the terminals at the application level prior to the setting up of the teleconference. The role of the GC is to generate the KEKs, TEK, and a suitable set of LKH keys and to distribute these to other members of the group. Any one of the participants in the teleconference may use the (current) TEK to decrypt received data encrypted with the TEK, and may use the TEK to encrypt data and multicast this to the other participants.

A prerequisite for participation in a teleconference is that a terminal possesses an IPv6 address which consists of a routing part (e.g. identifying the network access node to which the terminal is attached—in the case of a wireless terminal making use of a 3G network, this access node may be for example a GGSN and a host part or InterfaceID part. This InterfaceID part is generated by the terminal itself, although it may need to be approved by the network access node to ensure local uniqueness. The InterfaceID part is generated by applying a cryptographic hash over a public key (of a public-private key pair owned by the terminal) and at least one other parameter, e.g. a random number. Details of this procedure are not described here in detail. Rather, the reader should refer to British patent publication number GB2367986 for further details. The result is that the IP address is bound to the public key of the terminal.

A first step in the setting up of the teleconference is the registration of terminals 1 with the GC. Typically, the GC will invite terminals to join the conference by multicasting an invitation to a number of terminals (for example a group of terminals previously identified to the GC). Assuming that a terminal wants to participate, that terminal sends a (unicast) registration message to the GC. A registration message contains inter alia the originating IP address of candidate terminal sending the message, including the InterfaceID part, a copy of the terminal's public key, and a digital signature taken over the content of the message using the private key of the terminal's public-private key pair (e.g. obtained using the RSA algorithm).

The GC receives the registration messages from the various candidate terminals. For each message, the GC is able to recover the public key and the InterfaceID part of the source IP address which are in plain text. The GC knows the cryptographic hash function used by the candidate terminal to generate the InterfaceID part, as well as the other parameter(s). The GC can therefore verify that the claimed source IP address corresponds to the included public key. Using the signature, the GC can further verify that the candidate terminal owns the public-private key pair to which the public key belongs, therefore confirming that the candidate terminal owns the source IP address. Whilst a third party terminal may possess the public key of another party and could therefore generate an IP address containing the correct InterfaceID part, it could not generate the signature necessary to prove that it owns the correct public-private key pair. The GC is therefore able in an early phase to exclude replies from third party terminals pretending to be authorised participants, thus preventing so-called "denial-of-service" attacks.

It will be understood that some authorisation procedure may be required in addition to the described authentication procedure. For example, in the case of a teleconference, a procedure is required to ensure that only certain "invited" participants are included in the teleconference. Any appropriate authorisation procedure may be used.

Figure 1:
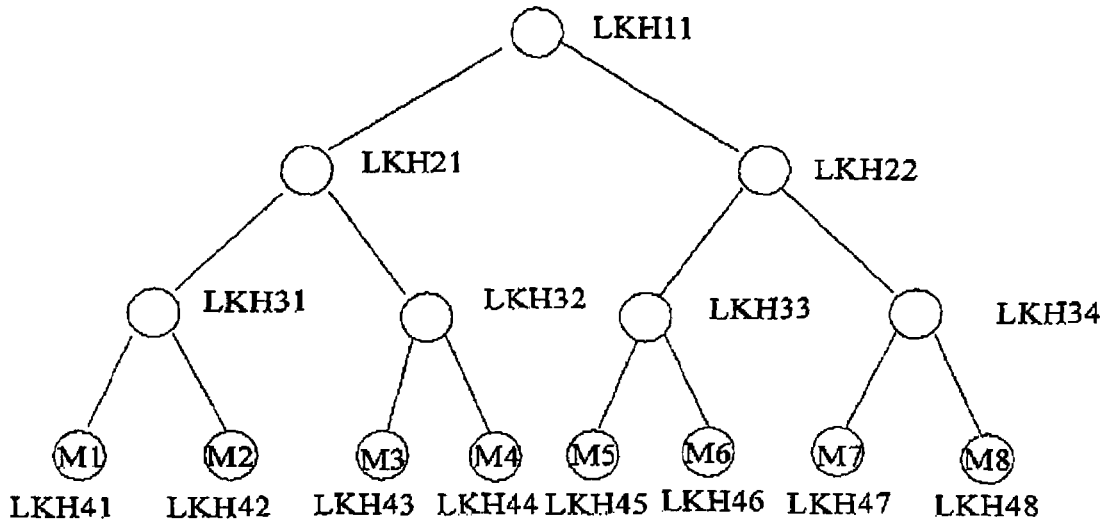
FIG. 1 illustrates the structure of a Logical Key Hierarchy.
Figure 2:
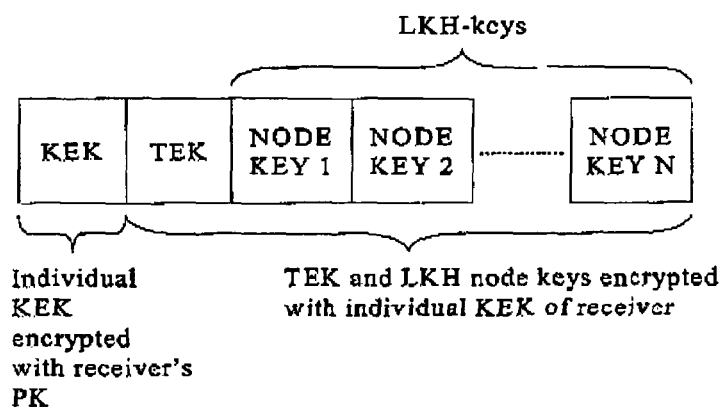
FIG. 2 illustrates schematically an initial keying message sent from a group controller to a receiver in a system implementing a Logical Key Hierarchy algorithm.

Following authentication of the responding candidate terminals (and any authorisation), the GC generates a TEK, LKH keys, and KEKs for each of the authenticated terminals. The GC then constructs a message (as illustrated in FIG. 2) for each terminal including the KEK encrypted with the public key of the terminal, and the TEK and LKH keys in the chain to that terminal encrypted with the KEK. The messages are unicast to respective receivers in the subnet. Each terminal can decrypt its own message in order to recover the TEK and the appropriate LKH keys. If a terminal subsequently leaves the group, the TEK and LKH keys can be updated and disseminated using the LKH rekeying method procedure. If a new candidate terminal is invited to join, the GC can verify that that terminal owns the claimed source IP address using the public key of the terminal, and can disseminate new TEK and LKH keys.

The authentication procedure described above can be applied to other services such as multimedia multicasts. In a typical scenario, pre-paid smart cards may be issued to subscribers, with a service controller retaining copies of the public key of a public-private key pair stored on the smart card. The described procedure is used to verify that candidate members for the service own the claimed public keys and the IP addresses (generated using their private keys), and thus to prevent denial of service attacks.

Figure 4:
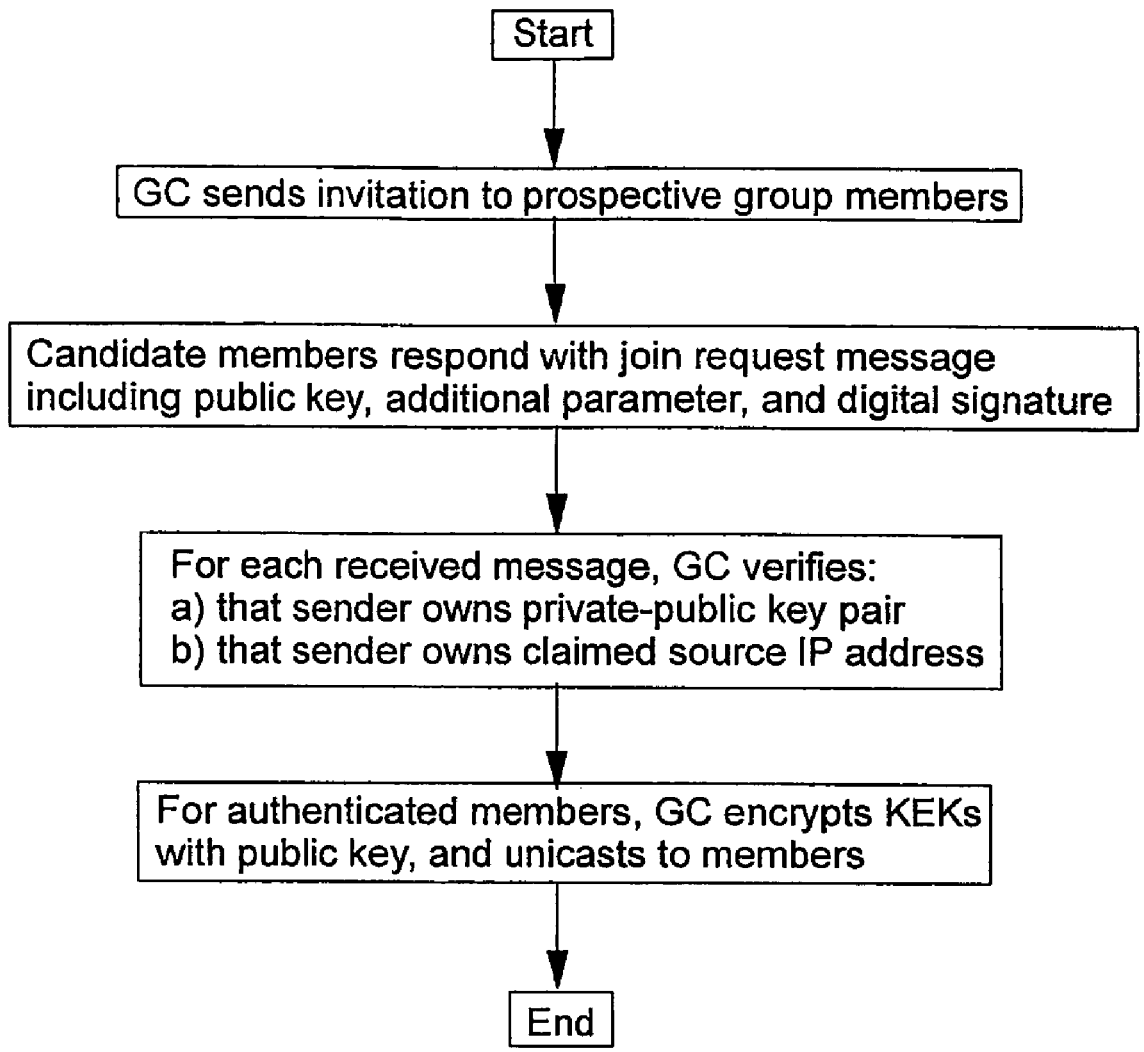
FIG. 4 is a flow diagram illustrating a method of setting up a teleconference.

FIG. 4 shows a flow diagram further illustrating the "weak" authentication procedure described above.

In the case of a subscription service using multicasting, the service controller (e.g. a server attached to a 3G network) must be able to authenticate and authorise terminals wishing to receive the multicast data. Typically this means that the controller must be able to confirm that terminals have paid for the service which they are requesting. It is possible that a terminal will pay for a service some time in advance of its seeking to use the service and/or that the terminal will pay for multiple use of the service. Any authentication/authorisation procedure must be able to handle these scenarios.

The procedure proposed here relies upon the service controller issuing to a terminal which has paid in advance for a service (or to a terminal for which a credit check has been performed or for which payment has been received from some third party), a certificate binding the terminal's public key to the payment. The certificate include the terminal's public key and a signature, generated at the controller by applying some cryptographic algorithm and the terminal's private key (known also to the controller) to the contents of the certificate.

When the terminal wishes to make use of a paid for multicast service, it sends a service request, containing the certificate, to the service controller. Both authentication and authorisation of the candidate terminal are handled by using a proof-of-possession method whereby the candidate subscriber proves ownership of the public key contained in the certificate. This method might involve the service controller sending a random number or "nonce" and time-stamp, together with an identification of the certificate in question, to the terminal following receipt of a request to join the service. The terminal applies the private key associated with the previously paid for certificate and a cryptographic hashing function to the nonce and time-stamp to generate a signature. The signature is returned to the controller. The controller is able to access all certificates issued to subscribers (held in a database attached to the controller or at least accessible by the controller), and is therefore able to use the public key claimed by the terminal to verify the signature and therefore to authenticate and authorise the terminal. The controller can then generate a unique KEK for the terminal. The KEK is encrypted using the terminal's public key and is unicast to the terminal together with the new TEK and appropriate LKH keys (encrypted with the KEK). The new TEK and LKH keys are disseminated to other subscribing terminals using the LKH rekeying procedure.

It will be appreciated that this procedure is extremely flexible in that certificates can be issued in respect of a one time or multi-access to a service, or in respect of access to a collection of services. It is only necessary for the controller to be able to associate a certificate with a paid for service or services and access level. In the case of a terminal which is able to roam between networks, and which has obtained a certificate from a given one of the networks, when the terminal seeks to access a service of another network, that network may obtain the appropriate certificate (or at least the public key of that certificate) from the certificate issuing network in order to authenticate and authorise the terminal.

Figure 5:
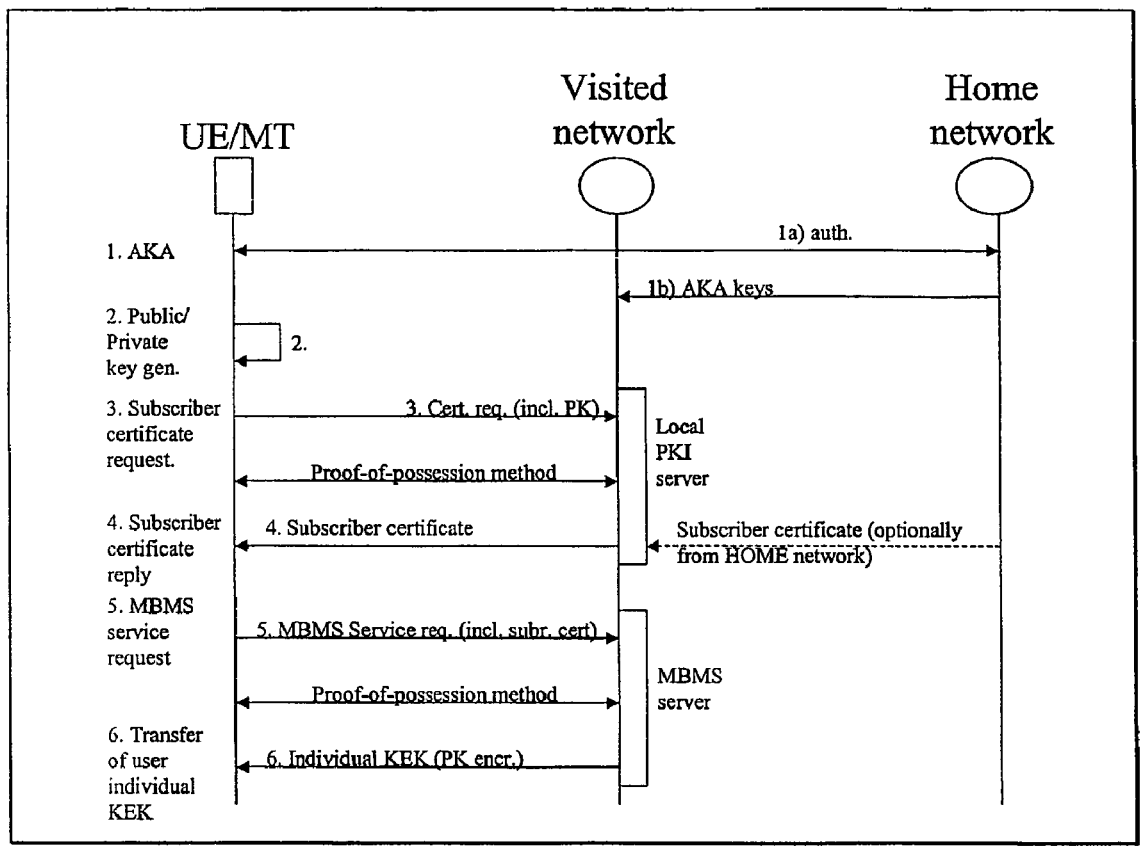
FIG. 5 is a signalling diagram illustrating signalling associated with authorising a subscriber to participate in a multicast service.

The signalling diagram of FIG. 5 illustrates signalling which might typically be associated with a roaming terminal obtaining a certificate for a multicast service and the subsequent use of that certificate to access the service, for a mobile wireless terminal (MT) or user equipment (UE) having a subscription with a 3G network (the "home network"). The MT is shown attached to a visited network.

When the MT first attempts to register with the visited network, that network must seek authorisation from the home network. A procedure known as Authentication and Key Agreement (AKA), specified in 3G, is used to perform authentication and to transfer integrity and security keys from the home network to the visited network. The MT then generates a public-private key pair, and sends the public key to the visited network in a certificate request message. This message could include an electronic cash payment for the service, or an authorisation for the visited network to charge the home network for the service. Once payment has been verified, the visited network runs a proof-of-possession procedure to verify that the requesting terminal does indeed own the claimed public key. The procedure uses a nonce and time-stamp generated by the controller and sent to the terminal. The terminal returns a signature generated using its private key.

Assuming that the controller verifies the signature, it generates a certificate (see for example ftp://ftp.isi.edu/in-notes/rfc2510.txt) and sends the certificate to the terminal. The terminal receives and stores the certificate for later use as has already been described above.

It will be appreciated by the person of skill in the art that various modifications may be made to the above described embodiments without departing from the scope of the present invention. For example, rather than a certificate being generated within the visited network following receipt of certificate request from a terminal (FIG. 5), the visited network may request the certificate from the home network.

The invention claimed is:

1. A method of authenticating candidate members wishing to participate in an IP multicast via a communication network, where data sent as part of the multicast is to be secured using a key revocation based scheme the method comprising:
 a candidate member receiving a multicast invitation from a group controller to join the multicast;
 the candidate member sending a join request message to the group controller, the join request message including the candidate member's originating IPv6 address, a copy of the candidate member's public key from the candidate member's public-private key pair and a digital signature, the digital signature generated by applying a cryptographic hashing function to the candidate member's private key, from the candidate member's public-private key pair, a random number and time stamp, both received from the group controller;
 at the group controller, verifying that the public key received from the candidate member wishing to participate is owned by the candidate member and that the public key is associated with the respective candidate member's source IPv6 address by inspecting an interfaceID part of the IPv6 address;
 using the digital signature, further verifying that the candidate member owns the public-private key pair to which the public key belongs and that the candidate terminal owns the source IP address
 whereby a candidate subscriber proves ownership of the public key contained in a certificate.

2. The method according to claim 1, wherein said key revocation based scheme is a Logical Key Hierarchy based scheme.

3. The method according to claim 2, wherein, after the group controller has received the public key from a given candidate member and has verified that the public key is associated with the IPv6 address of the sender, the group controller sends a unique Key Encryption Key to the member, encrypted with that member's public key, and the group controller also sends a Traffic Encryption Key and a LKH key set to the member, encrypted with the Key Encryption Key.

4. The method according to claim 1, wherein each candidate member generates the interfaceID part of the candidate member's IPv6 address by taking a cryptographic hash over the candidate member's own public key and one or more other parameters.

5. The method according to claim 4, wherein upon receipt of the message, the group controller:
 a) using the received public key to confirm that the signature is valid, thus proving that the candidate member does indeed own the public-private key pair to which the received public key belongs and
 b) applying the same cryptographic hash, as used by the candidate member, to the public key and the other parameter(s) and comparing the result to the interfaceID part of the candidate member's IPv6 address, thus verifying that a source IPv6 address is owned by the candidate.

6. The method according to claim 1, wherein said IP multicast comprises:
 a one-way multicast where a single node multicasts a stream of data to several other nodes;
 a group multicast where group members multicast data to all other members of the group; or
 a tele-conference or a videoconference or a multimedia conference.

7. A method of authorizing a user to participate in by distributing security keys to the user using a key revocation based mechanism, the method comprising:

delivering a certificate to the user, the certificate verifying that a public-private key pair identified in the certificate can be validly used by the user to access said secure multicast or broadcast, wherein the certificate further includes a digital signature generated by applying a cryptographic algorithm and the user's private key to the contents of the certificate;

the user sending a join request message to a group controller, the join request message including the user's originating Ipv6 address, a copy of the user's public key from the user's public-private key pair and triggering a verification wherein a digital signature is returned to the group controller, the digital signature generated by applying a cryptographic hashing function to the user's private key, from the user's public-private key pair, a random number and time stamp, both received from the group controller;

subsequently verifying at a control node that the certificate is owned by the user using a proof-of-possession procedure that is based on the private key; and assuming that verification is obtained, using said public key to send a Key Encryption Key to the user.

8. The method according to claim 7, wherein said key revocation based scheme is a Logical Key Hierarchy based scheme.

9. The method according to claim 8, wherein said step of verifying at the control node that the certificate is owned by the user, is carried out after the control node receives a request from the user to join said secure multicast or broadcast.

10. The method according to claim 7, wherein said proof-of-possession procedure involves the control node sending a random number to the user in plain text, and the user sending a response to the control node containing a signature generated by applying the private key to the random number, wherein the control node is in possession of the user's certificate and can check whether or not the message is correctly signed with the user's private key.

11. The method according to claim 7, wherein the user to be authorized has a subscription to a first, home communication network and wishes to participate in a multicast or broadcast service via a second, visited network in which the user is roaming, the method comprising:

the visited network, in which the user is roaming, contacting the user's home network, upon receipt of an initial registration request from said user, to authorize the user;

following authorization by the home network, generating the certificate relating to said service and generating the public-private key pair, either at the user equipment or within one of the networks, and signing the certificate; and sending the certificate to the user.

12. The method according to claim 11, wherein an Authentication and Key Agreement (AKA) procedure is used to authorise the user.

13. A group controller for authenticating candidate members wishing to participate in an IP multicast via a communication network, where data sent as part of the multicast is to be secured using a key revocation based scheme requiring that each candidate member submit a public key to the group controller in order to become a participating candidate member, the group controller comprising:

means for sending a multicast invitation to a candidate member to join the multicast;

means for receiving from the candidate member a registration message, the registration message including the candidate member's originating IPv6 address, a copy of the candidate member's public key from the candidate member's public-private key pair and digital signature, the digital signature generated by applying a cryptographic hashing function to the candidate member's private key from the candidate member's public-private key pair a random number and time stamp, both received from the group controller;

means for verifying that the public key received from the candidate member wishing to participate is owned by the candidate member and that the public key is associated with the candidate member's originating IPv6 address by inspecting an interfaceID part of the originating IPv6 address;

means for using the digital signature, in proof-of-possession procedure based on the private key, for verifying that the candidate member owns the public-private key pair to which the public key belongs and that the candidate terminal owns the originating IPv6 address.

14. The group controller according to claim 13, wherein said key revocation based scheme is a Logical Key Hierarchy based scheme.

15. The group controller according to claim 13, further comprising:

means for receiving and storing a generated interfaceID part of the candidate member's originating IPv6 address and for receiving a joining request from the candidate member to the group controller which contains:

the member's originating IPv6 address including the generated interface ID;

the candidate member's own public key; and a signature over the entire message generated using the member's private key.

16. The group controller according to claim 15, further comprising means for, upon receipt of the message:

using the received public key to confirm that the signature is valid, thus proving that the candidate member does indeed own the public-private key pair to which the received public key belongs; and applying a cryptographic hash, used by the candidate member, to the public key and other parameters and comparing the result to the interfaceID part of the candidate member's IPv6 address, thus verifying that the IPv6 address is owned by the candidate member.

17. The group controller according to claim 16, wherein, after the group controller has received the public key from a given candidate member and has verified that the public key is associated with the IP address of the sender, the group controller having:

means for sending a unique Key Encryption Key to the candidate member, encrypted with that candidate member's public key; and means for sending a Traffic Encryption Key and a LKH key set to the candidate member, encrypted with the Key Encryption Key.

18. The group controller according to claim 13, wherein said IP multicast comprises:

means for a single node multicasting a stream of data to several other nodes;

means for a group multicast where group members multicast data to all other members of the group; or means for a tele-conference or a videoconference or a multimedia conference.

19. A group controller for authorizing a user to participate in a secure IP multicast or broadcast by distributing security keys to the user using a key revocation based mechanism, the group controller comprising:
- means for receiving a join request message from the user, the join request message including the user's originating IPv6 address, a copy of the user's public key from the user's public-private key pair;
- means for verifying a digital signature generated by applying a cryptographic hashing function to the user's private key, from the user's public-private key pair, a random number and time stamp, both received from the group controller;
- means for delivering a certificate to the user, the certificate verifying that the public-private key pair identified in the certificate can be validly used by the user to access said secure multicast or broadcast, wherein the certificate includes a digital signature generated by applying a cryptographic algorithm and the user's private key to the contents of the certificate;
- means for subsequently verifying at a control node that the certificate is owned by the user using a proof-of-possession procedure that is based on the private key; and
- means for assuming that verification is obtained, using said public key to send a Key Encryption Key to the user.

20. The group controller according to claim 19, wherein said key revocation based scheme is a Logical Key Hierarchy based scheme.

21. The group controller according to claim 20, wherein means for verifying at the control node that the certificate is owned by the user, also verifies the certificate after the control node receives a request from the user to join said secure multicast or broadcast.

22. The group controller according to claim 19, wherein the control node further comprises:
- means for sending a random number in a message to the user in plain text; and
- means for receiving from the user a response containing a signature generated by applying the private portion of the public-private key to the random number, wherein the control node is in possession of the users certificate and can check whether or not the message is correctly signed with the user's private key.

23. The group controller according to claim 19, wherein the user to be authorized has a subscription to a first, home communication network and wishes to participate in a multicast or broadcast service via a second, visited network in which the user is roaming, the group controller including means for:
- the visited network, in which the user is roaming, contacting the users home network, upon receipt of an initial registration request from said user, to authorize the user
- receiving from the visited network contacting the user's home network, upon receipt of an initial registration request from said user, to authorize the user;
- means for generating the certificate relating to said service following authorization by the home network;
- means for generating the public-private key pair and signing the certificate; and
- means for sending the certificate to the user.

24. The group controller according to claim 19, wherein an Authentication and Key Agreement (AKA) procedure is used to authorize the user.

* * * * *

UNITED STATES PATENT AND TRADEMARK OFFICE
CERTIFICATE OF CORRECTION

PATENT NO.       : 7,627,755 B2
APPLICATION NO.  : 10/527368
DATED            : December 1, 2009
INVENTOR(S)      : Ahonen et al.

It is certified that error appears in the above-identified patent and that said Letters Patent is hereby corrected as shown below:

On the Title Page, in Field (75), under "Inventors", in Column 1, Line 1, delete "Iikka," and insert -- Ilkka, --, therefor.

In Column 2, Line 11, delete "(LHK)" and insert -- (LKH) --, therefor.

In Column 2, Line 65, delete "GC." and insert -- GC). --, therefor.

In Column 9, Line 1, in Claim 7, after "participate in" insert -- a secure IP multicast or broadcast --.

Signed and Sealed this

Sixteenth Day of March, 2010

David J. Kappos
*Director of the United States Patent and Trademark Office*